(12) United States Patent
Kidani et al.

(10) Patent No.: US 11,463,684 B2
(45) Date of Patent: Oct. 4, 2022

(54) IMAGE DECODING DEVICE, IMAGE ENCODING DEVICE, IMAGE PROCESSING SYSTEM, IMAGE DECODING METHOD, AND PROGRAM

(71) Applicant: KDDI CORPORATION, Tokyo (JP)

(72) Inventors: Yoshitaka Kidani, Fujimino (JP); Kei Kawamura, Fujimino (JP); Haruhisa Kato, Fujimino (JP); Sei Naito, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 16/982,142

(22) PCT Filed: Mar. 22, 2019

(86) PCT No.: PCT/JP2019/011987
§ 371 (c)(1),
(2) Date: Sep. 18, 2020

(87) PCT Pub. No.: WO2019/235026
PCT Pub. Date: Dec. 12, 2019

(65) Prior Publication Data
US 2021/0112242 A1     Apr. 15, 2021

(30) Foreign Application Priority Data
Jun. 6, 2018 (JP) .............................. JP2018-108888

(51) Int. Cl.
*H04N 19/105* (2014.01)
*H04N 19/593* (2014.01)
(Continued)

(52) U.S. Cl.
CPC ......... *H04N 19/105* (2014.11); *H04N 19/136* (2014.11); *H04N 19/593* (2014.11); *H04N 19/117* (2014.11); *H04N 19/176* (2014.11)

(58) Field of Classification Search
CPC ...... H04N 19/105; H04N 19/14; H04N 19/46; H04N 19/593
See application file for complete search history.

(56) References Cited

U.S. PATENT DOCUMENTS

| 10,681,366 B2 | 6/2020 | Kawamura et al. |
| 2013/0188883 A1* | 7/2013 | Gisquet .................. H04N 19/11 382/233 |

(Continued)

FOREIGN PATENT DOCUMENTS

| JP | 2013090015 A | 5/2013 |
| JP | 2017-538381 A | 12/2017 |

(Continued)

OTHER PUBLICATIONS

"Position Dependent Linear Intra Prediction for Image Coding"—Li Zhang, Siwei Ma, Wen Gao; Proceedings of 2010 IEEE 17th International Conference on Image Processing; Sep. 26-29, 2010, Hong Kong. (Year: 2010).*

(Continued)

*Primary Examiner* — Mainul Hasan
(74) *Attorney, Agent, or Firm* — Troutman Pepper Hamilton Sanders LLP

(57) ABSTRACT

A decoding-side first generation unit generating, for a target unit, a first component prediction sample. A decoding-side linear prediction unit using the first component sample and a prediction coefficient to generate a linear prediction sample of a second component. A decoding-side second generation unit using the second component linear prediction sample to generate, for the target unit, a second component prediction sample. The decoding-side linear prediction unit uses a first coefficient as the prediction coefficient when the first component sample is equal to or below a threshold value, and uses a second coefficient, different from the first, as the prediction coefficient when the first compo- (Continued)

... LINEAR PREDICTION SOURCE
 ... LINEAR PREDICTION TARGET nent sample is greater than the threshold value. The threshold value is set on a parameter representing a distribution or change in a reference sample of the first component and/or the second component contained in a reference unit referenced for the target unit.

10 Claims, 9 Drawing Sheets

(51) Int. Cl.
  *H04N 19/136* (2014.01)
  *H04N 19/117* (2014.01)
  *H04N 19/176* (2014.01)

(56) References Cited

U.S. PATENT DOCUMENTS

| | | | |
|---|---|---|---|
| 2015/0036744 A1* | 2/2015 | Sato | H04N 19/33 375/240.12 |
| 2017/0150176 A1* | 5/2017 | Zhang | H04N 19/59 |
| 2017/0272749 A1* | 9/2017 | Pettersson | H04N 19/17 |
| 2018/0077426 A1* | 3/2018 | Zhang | H04N 19/186 |
| 2019/0166370 A1* | 5/2019 | Xiu | H04N 19/176 |
| 2019/0394460 A1* | 12/2019 | Lee | H04N 19/96 |
| 2020/0059667 A1* | 2/2020 | Lee | H04N 19/119 |

FOREIGN PATENT DOCUMENTS

| | | |
|---|---|---|
| WO | 2016051893 A1 | 4/2016 |
| WO | 2017059926 A1 | 4/2017 |

OTHER PUBLICATIONS

International Search Report issued in corresponding International Patent Application No. PCT/JP2019/011987 dated Jun. 25, 2019, with English translation.

Sakae et al., H.265/HVEC Textbook, First Edition, Impress Corporation 12 pages, (Oct. 21, 2013) submitted in Japanese cited in ISR submitted herewith.

Zhang, K., et al. "EE5: Enhanced Cross-component Linear Model Intra-prediction" Joint Video Exploration Team (JVET) of ITU-T SG 16 WP 3 and ISO/IEC JTC 1/SC 29/WG 11, 5 pages (Jan. 12-20, 2017) cited in ISR submitted herewith.

Chen, J., et al. "Algorithm Description of Joint Exploration Test Model 7 (JEM 7)" Joint Video Exploration Team (JVET) of ITU-T SG 16 WP 3 and ISO/IEC JTC 1/SC 29/WG 11, 11 pages (Jul. 13-21, 2017) cited in Specificaton and cited in ISR submitted herewith.

ITU-T H.265 v5 "Series H: Autiovisual and Multimedia Systems Infrastructure of audiovisual services—Coding of moving video High Efficiency Video Coding" International Telecommunication Union, 692 pages (Feb. 2018) cited in Specification.

Japanese Office Action dated Jan. 14, 2022 corresponding to Japanese Patent Application No. 2018-108888.

Geert Van der Auwera et al., "Description of Core Experiment 3: Intra Prediction and Mode Coding", Joint Video Experts Team (JVET) of ITU-T SG WP3 and ISO/IEC JTC I/SC 29/WG 11, 10th Meeting: San Diego, USA, Apr. 10-20, 2018, pp. 1-16.

\* cited by examiner

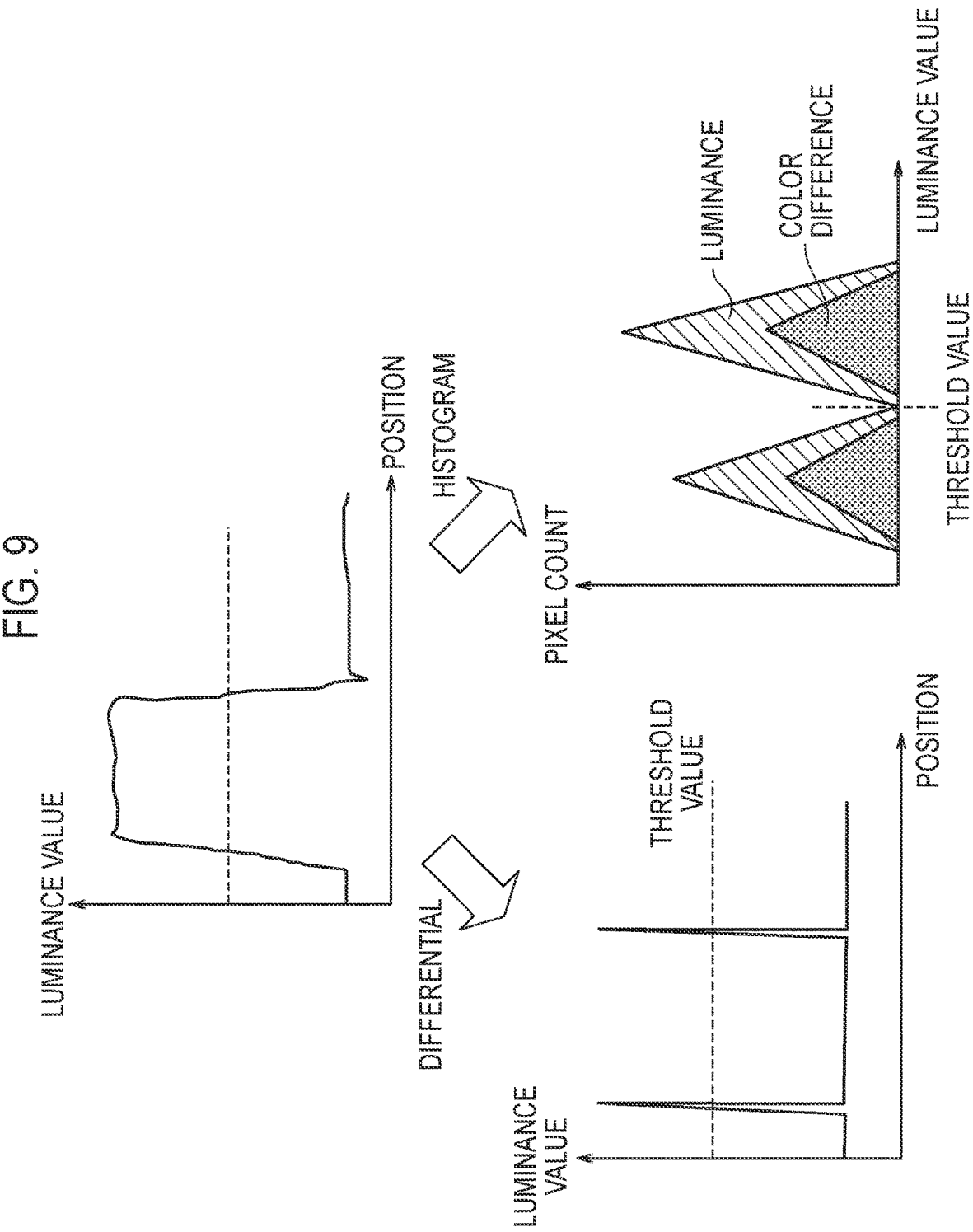

IMAGE DECODING DEVICE, IMAGE ENCODING DEVICE, IMAGE PROCESSING SYSTEM, IMAGE DECODING METHOD, AND PROGRAM

CROSS REFERENCE TO RELATED APPLICATIONS

This is a U.S. National Phase Application under 35 U.S.C. § 371 of International Patent Application No. PCT/JP2019/011987, filed Mar. 22, 2019, which claims priority of Japanese Patent Application No. 2018-108888, filed Jun. 6, 2018. The entire contents of which are hereby incorporated by reference.

FIELD OF THE INVENTION

The present invention relates to an image decoding device, an image encoding device, an image processing system, an image decoding method, and a program.

BACKGROUND ART

Conventionally, technology (for example, High Efficiency Video Coding (HEVC)) for generating a predicted residual signal consisting of the difference between a prediction signal generated through intra-prediction (prediction within a frame) or inter-prediction (prediction between frames), and an input image signal and for performing transformation processing and quantization processing of the predicted residual signal has been proposed (ITU-T H.265 High Efficiency Video Coding, for example).

Furthermore, luminance/color-difference linear (linear model (LM)) prediction, which generates a prediction signal of a color-difference component on the basis of a reconfigured signal of a luminance component, has been considered using a system (versatile video coding (VVC)) which represents the next generation of HEVC above. As such LM prediction, multiple mode LM (MMLM) prediction, which uses a prediction coefficient used for LM prediction on the basis of whether the reconfigured signal of the luminance component is equal to or below a threshold value has also been considered (Algorithm Description of Joint Exploration Test Model7 (JEM7), for example).

SUMMARY

Incidentally, in the foregoing MMLM prediction, the average value of reference samples contained in reference units adjacent to the target unit of the luminance component is used as the threshold value. However, in such a configuration, because the edge-component related sensitivity is low, the prediction coefficient used for LM prediction cannot be suitably used.

Therefore, the present invention was conceived in view of the foregoing problem, and an object of the present invention is to provide an image decoding device, an image encoding device, an image processing system, an image decoding method, and a program that enable a prediction coefficient which is used for linear prediction to be suitably used.

The first aspect is summarized as an image decoding device, including: a decoding-side first generation unit that generates, for a target unit, a prediction sample of a first component; a decoding-side linear prediction unit that uses the sample of the first component and a prediction coefficient to generate a linear prediction sample of a second component; and a decoding-side second generation unit that uses the linear prediction sample of the second component to generate, for the target unit, a prediction sample of the second component, wherein the decoding-side linear prediction unit uses a first coefficient as the prediction coefficient when the sample of the first component is equal to or below a threshold value, and uses a second coefficient which is different from the first coefficient as the prediction coefficient when the sample of the first component is greater than the threshold value; and the threshold value is set on the basis of a parameter representing a distribution of or a change in a reference sample of the first component and/or the second component contained in a reference unit which is referenced for the target unit.

The second aspect is summarized as an image encoding device, including: an encoding-side first generation unit that generates, for a target unit, a prediction sample of a first component; an encoding-side linear prediction unit that uses the sample of the first component and a prediction coefficient to generate a linear prediction sample of a second component; and an encoding-side second generation unit that uses the linear prediction sample of the second component to generate, for the target unit, a prediction sample of the second component, wherein the encoding-side linear prediction unit uses a first coefficient as the prediction coefficient when the sample of the first component is equal to or below a threshold value, and uses a second coefficient which is different from the first coefficient as the prediction coefficient when the sample of the first component is greater than the threshold value; and the threshold value is set on the basis of a parameter representing a distribution of or a change in a reference sample of the first component and/or the second component contained in a reference unit which is referenced for the target unit.

The third aspect is summarized as an image processing system including an image encoding device and an image decoding device, the image encoding device including: an encoding-side first generation unit that generates, for a target unit, a prediction sample of a first component; an encoding-side linear prediction unit that uses the sample of the first component and a prediction coefficient to generate a linear prediction sample of a second component; and an encoding-side second generation unit that uses the linear prediction sample of the second component to generate, for the target unit, a prediction sample of the second component; and the image decoding device including: a decoding-side first generation unit that generates, for the target unit, a prediction sample of the first component; a decoding-side linear prediction unit that uses the sample of the first component and a prediction coefficient to generate a linear prediction sample of the second component; and a decoding-side second generation unit that uses the linear prediction sample of the second component to generate, for the target unit, a prediction sample of the second component, wherein the encoding-side linear prediction unit and the decoding-side linear prediction unit use a first coefficient as the prediction coefficient when the sample of the first component is equal to or below a threshold value, and use a second coefficient which is different from the first coefficient as the prediction coefficient when the sample of the first component is greater than the threshold value; and the threshold value is set on the basis of a parameter representing a distribution of or a change in a reference sample of the first component and/or the second component contained in a reference unit which is referenced for the target unit.

The fourth aspect is summarized as a program that causes a computer to execute the steps of: (A) generating, for a target unit, a prediction sample of a first component; (B) using the sample of the first component and a prediction coefficient to generate a linear prediction sample of a second component; and (C) using the linear prediction sample of the second component to generate, for the target unit, a prediction sample of the second component, wherein the step (B) includes the steps of: using a first coefficient as the prediction coefficient when the sample of the first component is equal to or below a threshold value; and using a second coefficient which is different from the first coefficient as the prediction coefficient when the sample of the first component is greater than the threshold value; and the threshold value is set on the basis of a parameter representing a distribution of or a change in a reference sample of the first component and/or the second component contained in a reference unit which is referenced for the target unit.

The fifth aspect is summarized as a program that causes a computer to execute the steps of: (A) generating, for a target unit, a prediction sample of a first component; (B) using the sample of the first component and a prediction coefficient to generate a linear prediction sample of a second component; and (C) using the linear prediction sample of the second component to generate, for the target unit, a prediction sample of the second component, wherein the step (B) includes the steps of: uses a first coefficient as the prediction coefficient when the sample of the first component is equal to or below a threshold value; and uses a second coefficient which is different from the first coefficient as the prediction coefficient when the sample of the first component is greater than the threshold value; and the threshold value is set on the basis of a parameter representing a distribution of or a change in a reference sample of the first component and/or the second component contained in a reference unit which is referenced for the target unit.

According to one embodiment, it is possible to provide an image decoding device, an image encoding device, an image processing system, an image decoding method, and a program that enable a prediction coefficient which is used for linear prediction to be suitably used.

BRIEF DESCRIPTION OF DRAWINGS

FIG. 9 is a diagram to illustrate the threshold value setting method according to the embodiment.

DETAILED DESCRIPTION

Figure 1:
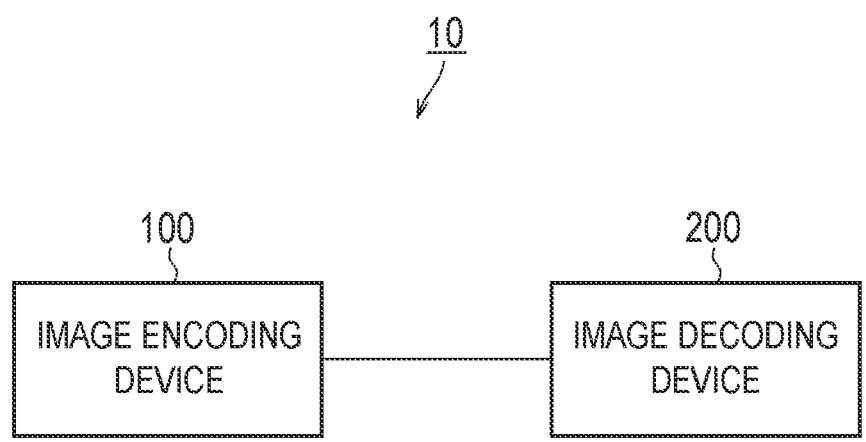
FIG. 1 is a diagram illustrating an image processing system 10 according to an embodiment.

An embodiment will be described hereinbelow with reference to the drawings. Note that, in the description of the drawings hereinbelow, the same or similar reference signs are assigned to the same or similar parts.

However, it should be noted that the drawings are schematics and that the proportions of each of the dimensions, and the like, sometimes differ from the real proportions and so forth. Therefore, specific dimensions and so forth should be determined by referring to the description hereinbelow. Furthermore, it is obvious that the drawings may also contain parts the dimensional relationships or proportions of which differ between drawings.

Outline of Disclosure

An image decoding device according to an outline of the disclosure includes: a decoding-side first generation unit that generates, for a target unit, a prediction sample of a first component; a decoding-side linear prediction unit that uses the sample of the first component and a prediction coefficient to generate a linear prediction sample of a second component; and a decoding-side second generation unit that uses the linear prediction sample of the second component to generate, for the target unit, a prediction sample of the second component. The decoding-side linear prediction unit uses a first coefficient as the prediction coefficient when the sample of the first component is equal to or below a threshold value and uses a second coefficient which is different from the first coefficient as the prediction coefficient when the sample of the first component is greater than the threshold value. The threshold value is set on the basis of a parameter representing a distribution of or a change in a reference sample of the first component and/or the second component contained in a reference unit which is referenced for the target unit.

In the image decoding device according to an outline of the disclosure, a threshold value for using the prediction coefficient is set on the basis of a distribution of or a change in the reference sample of the first component and/or the second component. In comparison with a case where the threshold value is set on the basis of an average value of the reference samples, information relating to an edge component can be taken into account, enabling the prediction coefficient to be used suitably.

An image encoding device according to an outline of the disclosure includes: an encoding-side first generation unit that generates, for a target unit, a prediction sample of a first component; an encoding-side linear prediction unit that uses the sample of the first component and a prediction coefficient to generate a linear prediction sample of a second component; and an encoding-side second generation unit that uses the linear prediction sample of the second component to generate, for the target unit, a prediction sample of the second component. The encoding-side linear prediction unit uses a first coefficient as the prediction coefficient when the sample of the first component is equal to or below a threshold value and uses a second coefficient which is different from the first coefficient as the prediction coefficient when the sample of the first component is greater than the threshold value. The threshold value is set on the basis of a parameter representing a distribution of or a change in a reference sample of the first component and/or the second component contained in a reference unit which is referenced for the target unit.

In the image encoding device according to an outline of the disclosure, a threshold value for using the prediction coefficient is set on the basis of a distribution of or a change in the reference sample of the first component and/or the second component. In comparison with a case where the threshold value is set on the basis of an average value of the reference samples, information relating to an edge component can be taken into account, enabling the prediction coefficient to be used suitably.

As an outline of the disclosure, an image decoding method pertaining to the foregoing operations of the image decoding device may be provided, and an image encoding method pertaining to the foregoing operations of the image encoding device may be provided. As an outline of the disclosure, an image processing system that has the foregoing image decoding device and image encoding device may be provided. As an outline of the disclosure, a program pertaining to the foregoing operations of the image decoding device may be provided, and a program pertaining to the foregoing operations of the image encoding device may be provided.

EMBODIMENT

Image Processing System

An image processing system according to an embodiment will be described hereinbelow. FIG. 1 is a diagram illustrating an image processing system 10 according to the embodiment.

As illustrated in FIG. 1, the image processing system 10 has an image encoding device 100 and an image decoding device 200. The image encoding device 100 generates encoded data by encoding an input image signal. The image decoding device 200 generates an output image signal by decoding the encoded data. The encoded data may be transmitted via a transmission line from the image encoding device 100 to the image decoding device 200. The encoded data may be provided from the image encoding device 100 to the image decoding device 200 after being stored on a storage medium.

Image Encoding Device

Figure 2:
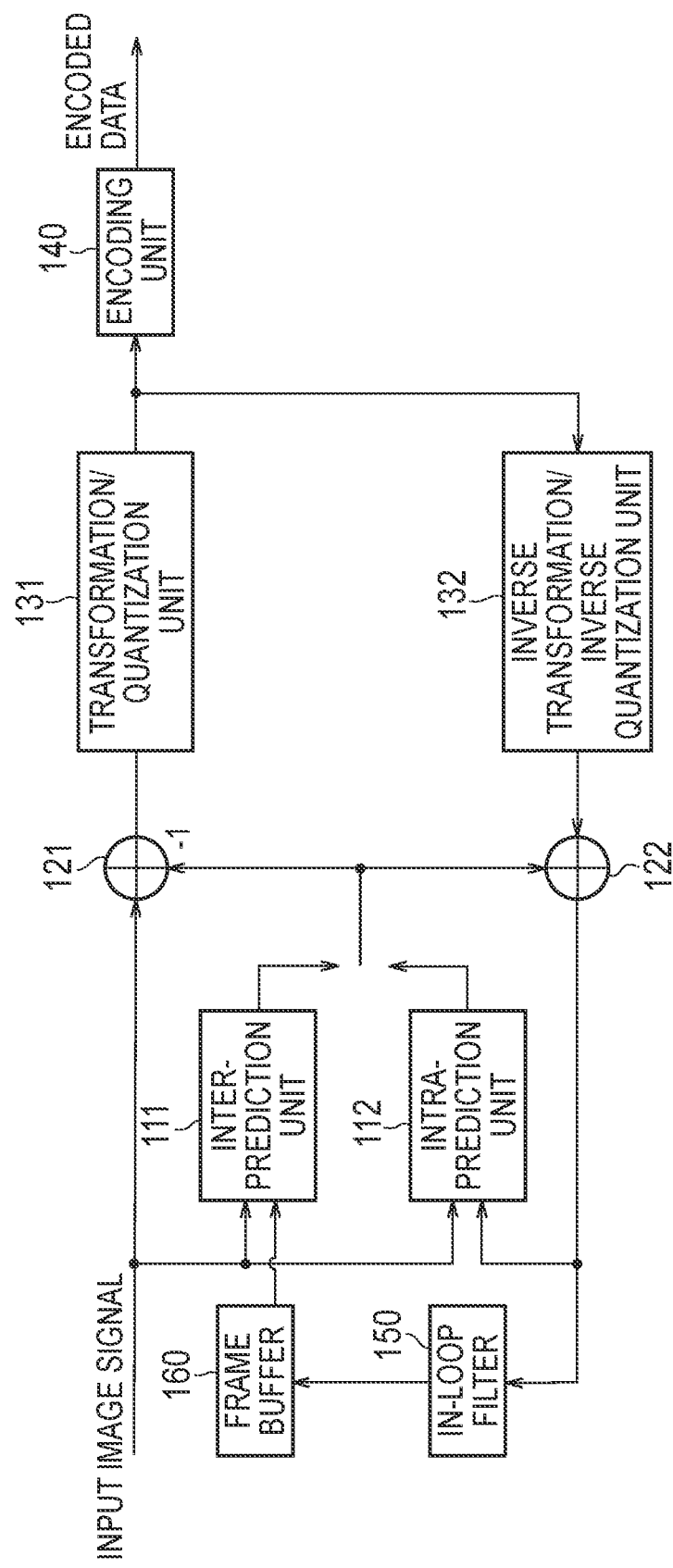
FIG. 2 is a diagram illustrating an image encoding device 100 according to the embodiment.

An image encoding device according to an embodiment will be described hereinbelow. FIG. 2 is a diagram illustrating an image encoding device 100 according to an embodiment.

As illustrated in FIG. 2, the image encoding device 100 includes an inter-prediction unit 111; an intra-prediction unit 112; a subtractor 121; an adder 122; a transformation/quantization unit 131; an inverse transformation/inverse quantization unit 132; an encoding unit 140; an in-loop filter 150; and a frame buffer 160.

The inter-prediction unit 111 generates a prediction signal by means of inter-prediction (prediction between frames). More specifically, the inter-prediction unit 111 specifies a reference unit that is contained in a reference frame by means of a comparison between an encoding target frame (target frame hereinbelow) and a reference frame stored in the frame buffer 160 and determines a predicted movement vector for the specified reference unit. The inter-prediction unit 111 generates, for each prediction unit, a prediction signal on the basis of a prediction unit and the predicted movement vector. The inter-prediction unit 111 outputs the prediction signal to the subtractor 121 and adder 122. The reference frame is a frame that differs from the target frame.

The intra-prediction unit 112 generates a prediction signal by means of intra-prediction (prediction within a frame). More specifically, the intra-prediction unit 112 specifies a reference unit that is contained in a target frame and generates a prediction signal for each prediction unit on the basis of the specified reference unit. The intra-prediction unit 112 outputs the prediction signal to the subtractor 121 and adder 122. The reference unit is a unit that is referenced for the prediction target unit (target unit hereinbelow). For example, the reference unit is a unit which is adjacent to the target unit.

The subtractor 121 subtracts the prediction signal from the input image signal and outputs a predicted residual signal to the transformation/quantization unit 131. Here, the subtractor 121 generates a predicted residual signal which consists of the difference between the prediction signal generated through inter-prediction or intra-prediction, and the input image signal.

The adder 122 adds the prediction signal to the predicted residual signal outputted from the inverse transformation/inverse quantization unit 132 and outputs a pre-filtering decoded signal to the intra-prediction unit 112 and in-loop filter 150. The pre-filtering decoded signal constitutes a reference unit used by the intra-prediction unit 112.

The transformation/quantization unit 131 performs processing to transform the predicted residual signal and acquires a coefficient level value. In addition, the transformation/quantization unit 131 may perform quantization of the coefficient level value. Transformation processing is processing to convert the predicted residual signal to a frequency component signal. In transformation processing, a base pattern (transformation matrix) corresponding to a discrete cosine transform (DCT) may be used, or a base pattern (transformation matrix) corresponding to a discrete sine transform (DST) may be used.

The inverse transformation/inverse quantization unit 132 performs inverse transformation processing of the coefficient level value outputted from the transformation/quantization unit 131. Here, the inverse transformation/inverse quantization unit 132 may perform inverse quantization of the coefficient level value in advance of inverse transformation processing. The inverse transformation processing and inverse quantization are performed in the opposite order to the transformation processing and quantization performed by the transformation/quantization unit 131.

The encoding unit 140 encodes the coefficient level value outputted from the transformation/quantization unit 131 and outputs encoded data. For example, the encoding is entropy encoding that assigns codes of different lengths on the basis of the probability of a coefficient level value being generated.

The encoding unit 140 encodes, in addition to the coefficient level value, control data which is used in decoding processing. The control data may contain size data such as the size of an encoding unit, the size of a prediction unit, and the size of a transform unit.

The in-loop filter 150 performs filter processing on the pre-filtering decoded signal which is outputted from the adder 122 and outputs a post-filtering decoded signal to the frame buffer 160. For example, the filter processing is deblocking filter processing that reduces distortion generated in the boundary sections between blocks (prediction units or transform units).

The frame buffer 160 stores a reference frame which is used by the inter-prediction unit 111. The post-filtering decoded signal constitutes the reference frame used by the inter-prediction unit 111.

Intra-Prediction Unit

Figure 3:
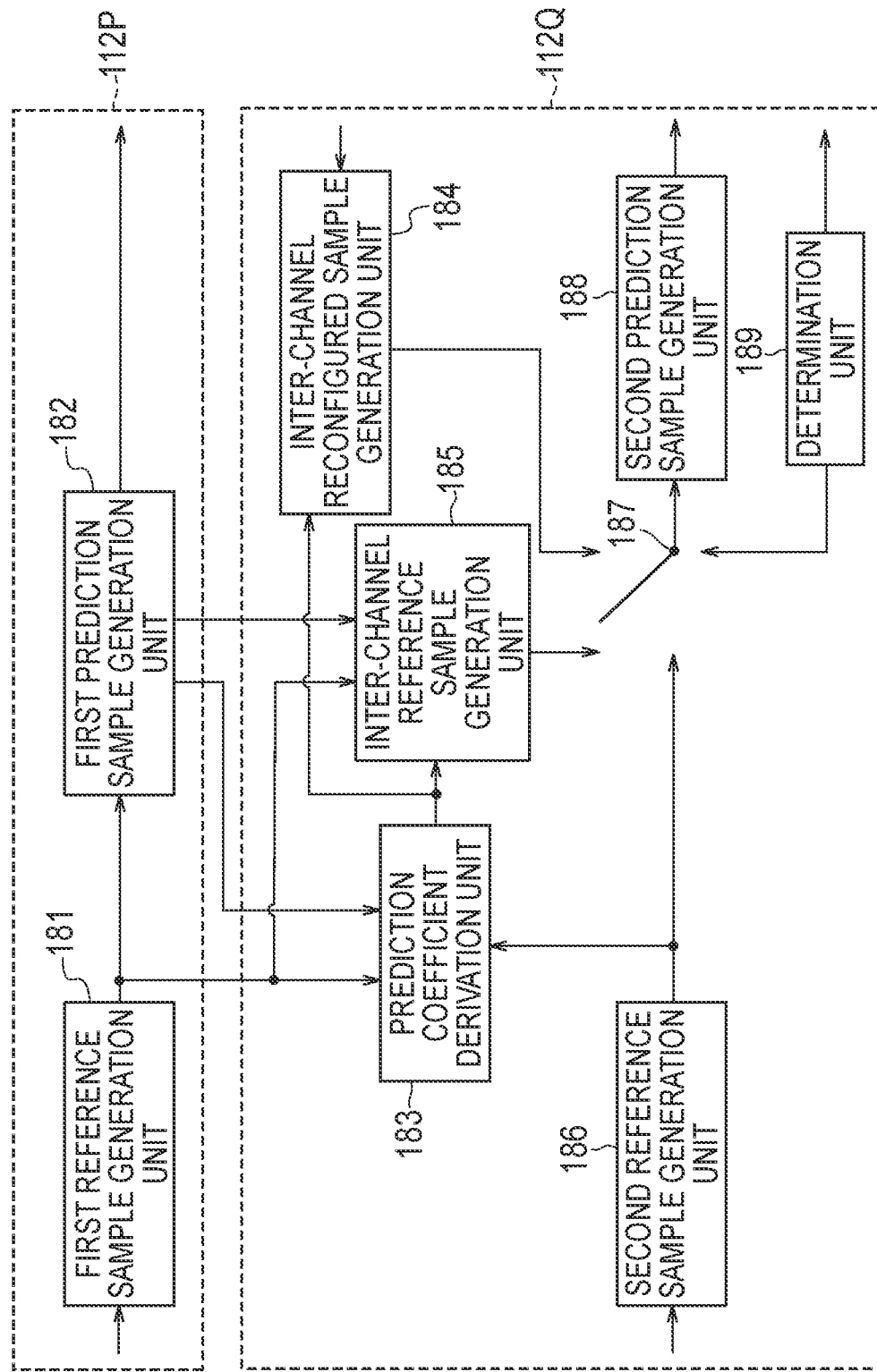
FIG. 3 is a diagram illustrating an intra-prediction unit 112 according to the embodiment.

An intra-prediction unit according to the embodiment will be described hereinbelow. FIG. 3 is a diagram illustrating an intra-prediction unit 112 according to the embodiment.

As illustrated in FIG. 3, the intra-prediction unit 112 has an intra-prediction unit 112P and an intra-prediction unit 112Q. The intra-prediction unit 112P generates a prediction signal of a first component through intra-prediction. For example, the first component is a luminance component. The intra-prediction unit 112Q generates a prediction signal of a second component through intra-prediction. For example, the second component is a color-difference component.

First, the intra-prediction unit 112P has a first reference sample generation unit 181 and a first prediction sample generation unit 182.

The first reference sample generation unit 181 generates a reference sample of a first component. For example, when a sample in a target reference position has been encoded, the first reference sample generation unit 181 generates, as a reference sample, a pre-filtering decoded signal of the first component outputted from the adder 122. On the other hand, when a sample in the target reference position has not been encoded, the first reference sample generation unit 181 generates, as a reference sample, a copy of a sample encoded in a reference position adjacent to the target reference position. The first reference sample generation unit 181 may also perform smoothing processing of the reference sample.

The first prediction sample generation unit 182 generates a prediction sample of a first component by using the reference sample outputted from the first reference sample generation unit 181. In the embodiment, the first prediction sample generation unit 182 is an example of an encoding-side first generation unit. Intra-prediction modes for generating a prediction sample of the first component include a direct current (DC) prediction mode, a planar prediction mode, and a directional prediction mode. The first prediction sample generation unit 182 outputs an intra-prediction mode for generating a prediction sample of the first component contained in the target unit to a prediction coefficient derivation unit 183 and an inter-channel reference sample generation unit 185.

Second, the intra-prediction unit 112Q includes the prediction coefficient derivation unit 183, an inter-channel reconfigured sample generation unit 184, the inter-channel reference sample generation unit 185, a second reference sample generation unit 186, a switch 187, a second prediction sample generation unit 188, and a determination unit 189.

The prediction coefficient derivation unit 183 derives a prediction coefficient which is used to generate a linear prediction sample of a second component on the basis of a sample of a first component. For example, the prediction coefficient derivation unit 183 may use a sample of the first component to derive the prediction coefficient, may use an intra-prediction mode of the first component to derive the prediction coefficient, or may use a reference sample of a second component to derive the prediction coefficient. The prediction coefficient derivation unit 183 may derive the prediction coefficient by using two or more of a sample of a first component, an intra-prediction mode of the first component, and a reference sample of a second component. In the embodiment, the prediction coefficient derivation unit 183 derives a first coefficient which is applied to a sample of the first component which is equal to or below a threshold value, and a second coefficient which is applied to a sample of the first component which is greater than the threshold value. The first coefficient and second coefficient are different from each other.

For example, the foregoing linear prediction is represented by the equation below. $\alpha_1$ and $\beta_1$ denote the first coefficient, and $\alpha_2$ and $\beta_2$ denote the second coefficient. $Pred_C[x,y]$ is a second-component linear prediction sample of a sample $[x,y]$, and $S'L[x,y]$ is a first-component sample of sample $[x,y]$.

$$Pred_C[x,y]=\alpha_1 \times S'_L[x,y]+\beta_1 \text{ if } S'L[x,y] \leq \text{Threshold}$$

$$Pred_C[x,y]=\alpha_2 \times S'_L[x,y]+\beta_2 \text{ if } S'L[x,y] > \text{Threshold} \quad \text{Equation 1}$$

Here, the threshold value is set on the basis of a parameter representing a distribution of or a change in a reference sample of the first component and/or the second component contained in a reference unit which is referenced for the target unit. The parameter may be any one of a differential value of the reference sample, a derivative value of the reference sample, a histogram of the reference sample, a median of the reference sample, and the position of an edge component of the reference sample. The details of the threshold value setting method are described subsequently by taking, by way of example, a reference sample differential value and a reference sample histogram (see FIGS. 8 and 9).

In the embodiment, the prediction coefficient derivation unit 183 may select a reference unit according to an intra-prediction mode which is acquired from the first prediction sample generation unit 182. For example, when the intra-prediction mode is horizontally close, the prediction coefficient derivation unit 183 selects a reference unit which is located horizontally to the target unit instead of selecting a reference unit which is located perpendicularly to the target unit. When the intra-prediction mode is perpendicularly close, the prediction coefficient derivation unit 183 selects a reference unit which is located perpendicularly to the target unit instead of selecting a reference unit which is located horizontally to the target unit.

The inter-channel reconfigured sample generation unit 184 uses a sample of the first component (here, a reconfigured sample of the first component) and a prediction coefficient to generate a linear prediction sample of the second component. In the embodiment, the prediction coefficient derivation unit 183 and inter-channel reconfigured sample generation unit 184 are examples of encoding-side linear prediction units. More specifically, the inter-channel reconfigured sample generation unit 184 uses the reconfigured sample of the first component contained in the target unit and the prediction coefficient outputted from the prediction coefficient derivation unit 183 to generate the linear prediction sample of the second component contained in the target unit. Although the inter-channel reconfigured sample generation unit 184 generates the linear prediction sample of the second component according to the foregoing equation, $S'L[x,y]$ is a reconfigured sample ($Rec'L[x,y]$) of the first component and is a pre-filtering decoded signal which is outputted from the adder 122 illustrated in FIG. 2.

The inter-channel reference sample generation unit 185 uses a sample of the first component (here, a reconfigured sample of the first component) and a prediction coefficient to generate a linear prediction sample of the second component. In the embodiment, the prediction coefficient derivation unit 183 and inter-channel reference sample generation unit 185 are examples of encoding-side linear prediction units. More specifically, the inter-channel reference sample generation unit 185 uses the reference sample of the first component contained in the reference unit and the prediction coefficient outputted from the prediction coefficient derivation unit 183 to generate the linear prediction sample of the second component contained in the reference unit. Although the inter-channel reference sample generation unit 185 generates the linear prediction sample of the second component according to the foregoing equation, $S'L[x,y]$ is a reference sample ($Ref'L[x,y]$) of the first component and is a pre-filtering decoded signal which is outputted from the adder 122 illustrated in FIG. 2.

In the embodiment, the inter-channel reference sample generation unit 185 may select a reference unit according to an intra-prediction mode which is acquired from the first prediction sample generation unit 182. For example, when the intra-prediction mode is horizontally close, the inter-channel reference sample generation unit 185 selects a reference unit which is located horizontally to the target unit instead of selecting a reference unit which is located perpendicularly to the target unit. When the intra-prediction mode is perpendicularly close, the inter-channel reference sample generation unit 185 selects a reference unit which is located perpendicularly to the target unit instead of selecting a reference unit which is located horizontally to the target unit.

The second reference sample generation unit 186 generates a reference sample of a second component. For example, when a sample in a target reference position has been encoded, the second reference sample generation unit 186 generates, as a reference sample, a pre-filtering decoded signal of the second component outputted from the adder 122. On the other hand, when a sample in the target reference position has not been encoded, the second reference sample generation unit 186 generates, as a reference sample, a copy of a sample encoded in a reference position adjacent to the target reference position. The second reference sample generation unit 186 may also perform smoothing processing of the reference sample.

The switch 187 switches the input to the second prediction sample generation unit 188 on the basis of a determination result of the determining unit 189. More specifically, the switch 187 selects an input source to the second prediction sample generation unit 188 from among the inter-channel reconfigured sample generation unit 184, the inter-channel reference sample generation unit 185, and the second reference sample generation unit 186.

The second prediction sample generation unit 188 generates a prediction sample of the second component by using a reference sample or a linear prediction sample which is acquired from the input source switched using the switch 187. In the embodiment, the second prediction sample generation unit 188 is an example of an encoding-side second generation unit.

Here, when the input source is the second reference sample generation unit 186, the second prediction sample generation unit 188 generates the prediction sample of the second component by using the reference sample outputted from the second reference sample generation unit 186. Intra-prediction modes for generating a prediction sample of the second component include a DC prediction mode, a planar prediction mode, and a directional prediction mode.

Figure 6:
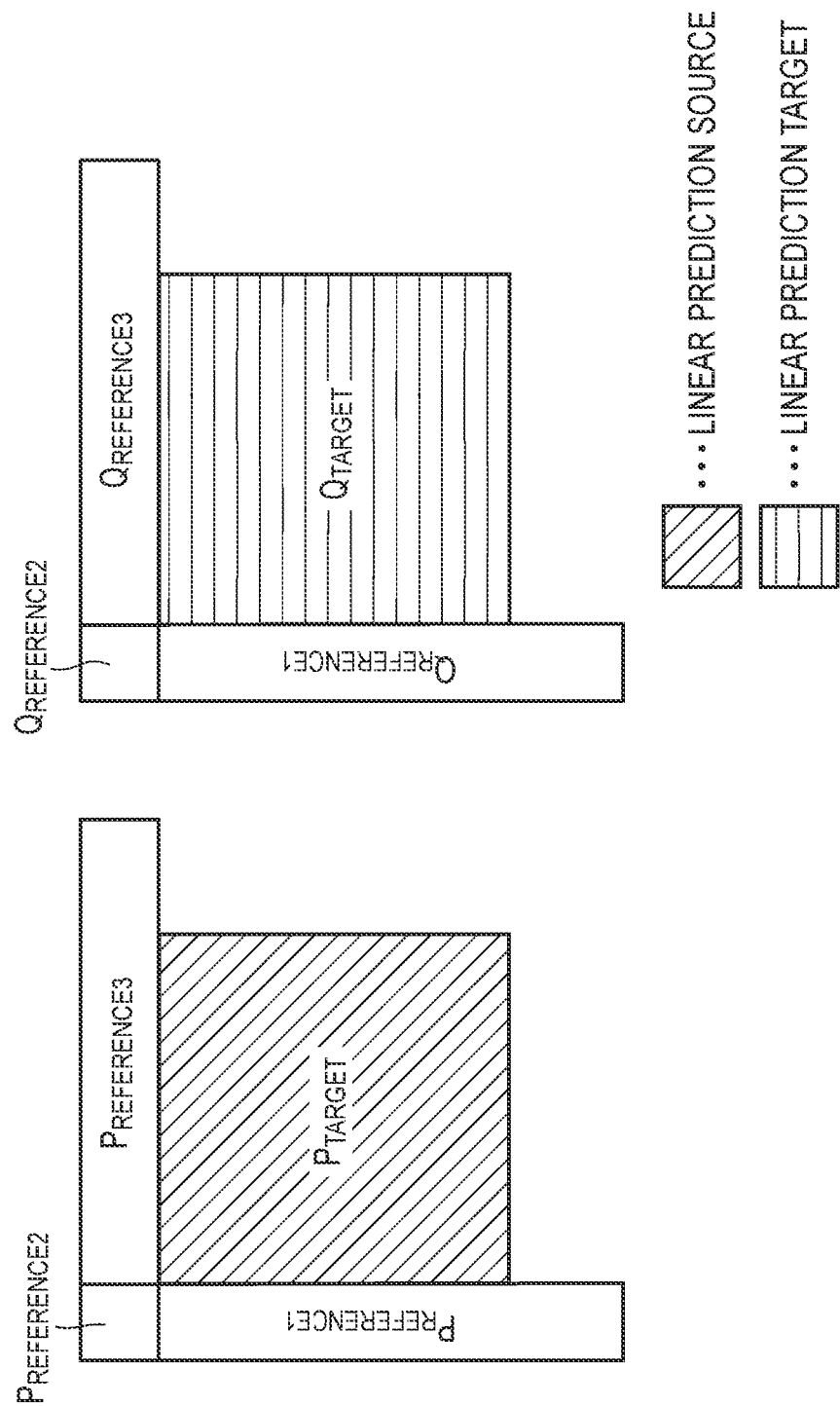
FIG. 6 is a diagram to illustrate a linear prediction method according to the embodiment.

On the other hand, when the input source is the inter-channel reconfigured sample generation unit 184, the second prediction sample generation unit 188 outputs, as the prediction sample of the second component, a second-component linear prediction sample of the target unit outputted from the inter-channel reconfigured sample generation unit 184 (see FIG. 6). When the input source is the inter-channel reference sample generation unit 185, the second prediction sample generation unit 188 generates the second-component prediction sample of the target unit through intra-prediction using the second-component linear prediction sample of the reference unit outputted from the inter-channel reference sample generation unit 185 (see FIG. 7).

The determination unit 189 determines the input source to the second prediction sample generation unit 188. The determination unit 189 outputs the determination result to the switch 187 and outputs, as control data to the image decoding device 200, an information element indicating the input source used for the generation of the prediction sample of the second component.

Here, the determination unit 189 may select the input source for which the encoding efficiency is highest. The input source may be pre-associated with one or more parameters selected from among the target unit position, target unit size, and the intra-prediction mode of the first component.

Image Decoding Device

Figure 4:
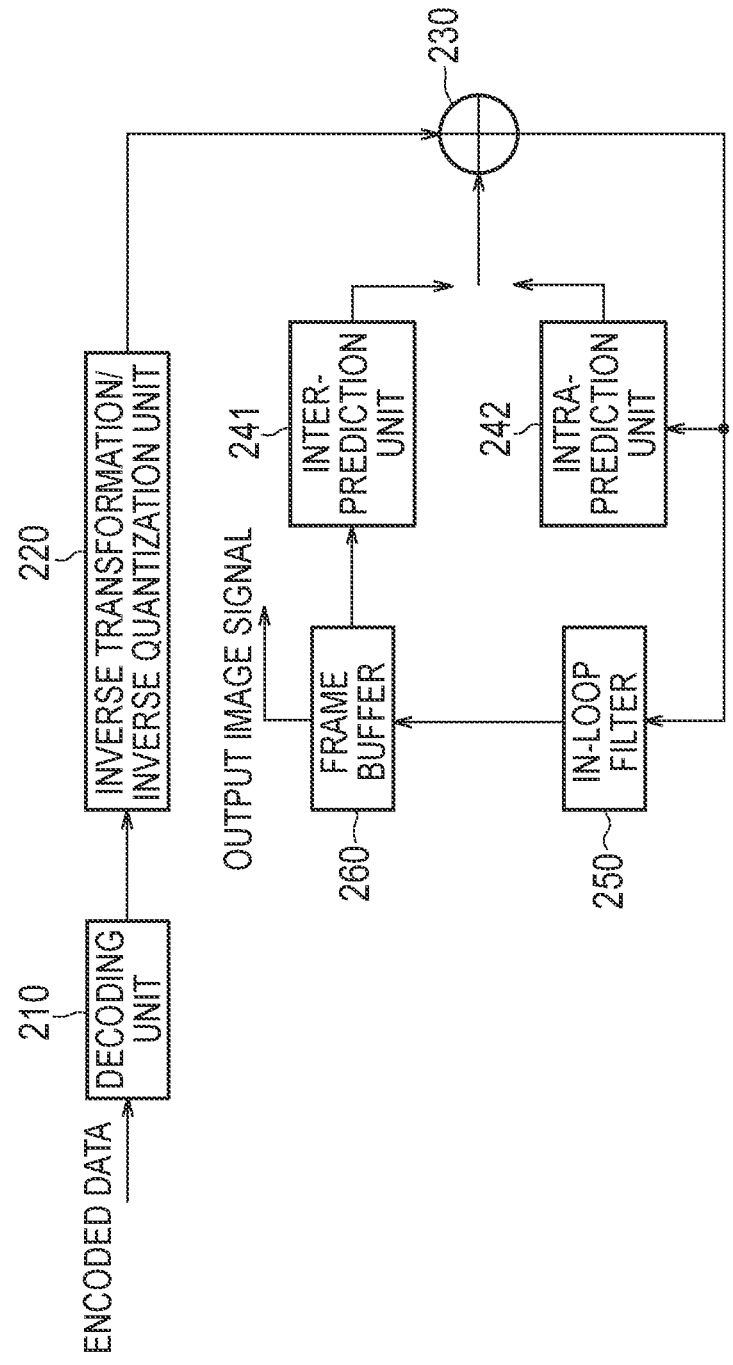
FIG. 4 is a diagram illustrating an image decoding device 200 according to the embodiment.

An image decoding device according to an embodiment will be described hereinbelow. FIG. 4 is a diagram illustrating an image decoding device 200 according to the embodiment.

As illustrated in FIG. 4, the image decoding device 200 includes a decoding unit 210, an inverse transformation/inverse quantization unit 220, an adder 230, an inter-prediction unit 241, an intra-prediction unit 242, an in-loop filter 250, and a frame buffer 260.

The decoding unit 210 decodes the encoded data generated by the image encoding device 100 and decodes a coefficient level value. For example, the decoding is entropy decoding in the opposite order to that of the entropy encoding performed by the encoding unit 140.

The decoding unit 210 may acquire control data by means of processing to decode encoded data. As mentioned earlier, the control data may contain size data such as an encoding unit size, a prediction unit size, and a transform unit size. The control data may contain an information element indicating the input source which is used for the generation of the prediction sample of the second component.

The inverse transformation/inverse quantization unit 220 performs inverse transformation processing of the coefficient level value outputted from the decoding unit 210. Here, the inverse transformation/inverse quantization unit 220 may perform inverse quantization of the coefficient level value in advance of inverse transformation processing. The inverse transformation processing and inverse quantization are performed in the opposite order to the transformation processing and quantization performed by the transformation/quantization unit 131.

The adder 230 adds the prediction signal to the predicted residual signal outputted from the inverse transformation/inverse quantization unit 220 and outputs a pre-filtering decoded signal to the intra-prediction unit 262 and in-loop filter 250. The pre-filtering decoded signal constitutes a reference unit used by the intra-prediction unit 262.

Like the inter-prediction unit 111, the inter-prediction unit 241 generates a prediction signal by means of inter-prediction (prediction between frames). More specifically, the inter-prediction unit 241 specifies a reference unit that is contained in a reference frame by means of a comparison between a target frame and a reference frame stored in the frame buffer 260 and determines a predicted movement vector for the specified reference unit. The inter-prediction unit 241 generates, for each prediction unit, a prediction signal on the basis of a prediction unit and the predicted movement vector. The inter-prediction unit 241 outputs a prediction signal to the adder 230.

Like the intra-prediction unit 112, the intra-prediction unit 262 generates a prediction signal by means of intra-prediction (prediction within a frame). More specifically, the intra-prediction unit 262 specifies a reference unit that is contained in a target frame and generates a prediction signal for each prediction unit on the basis of the specified reference unit. The intra-prediction unit 262 outputs a prediction signal to the adder 230.

Like the in-loop filter 150, the in-loop filter 250 performs filter processing on the pre-filtering decoded signal which is outputted from the adder 230 and outputs a post-filtering decoded signal to the frame buffer 260. For example, the filter processing is deblocking filter processing that reduces distortion generated in the boundary sections between blocks (prediction units or transform units).

Like the frame buffer 160, the frame buffer 260 stores a reference frame which is used by the inter-prediction unit 241. The post-filtering decoded signal constitutes the reference frame used by the inter-prediction unit 241.

Intra-Prediction Unit

Figure 5:
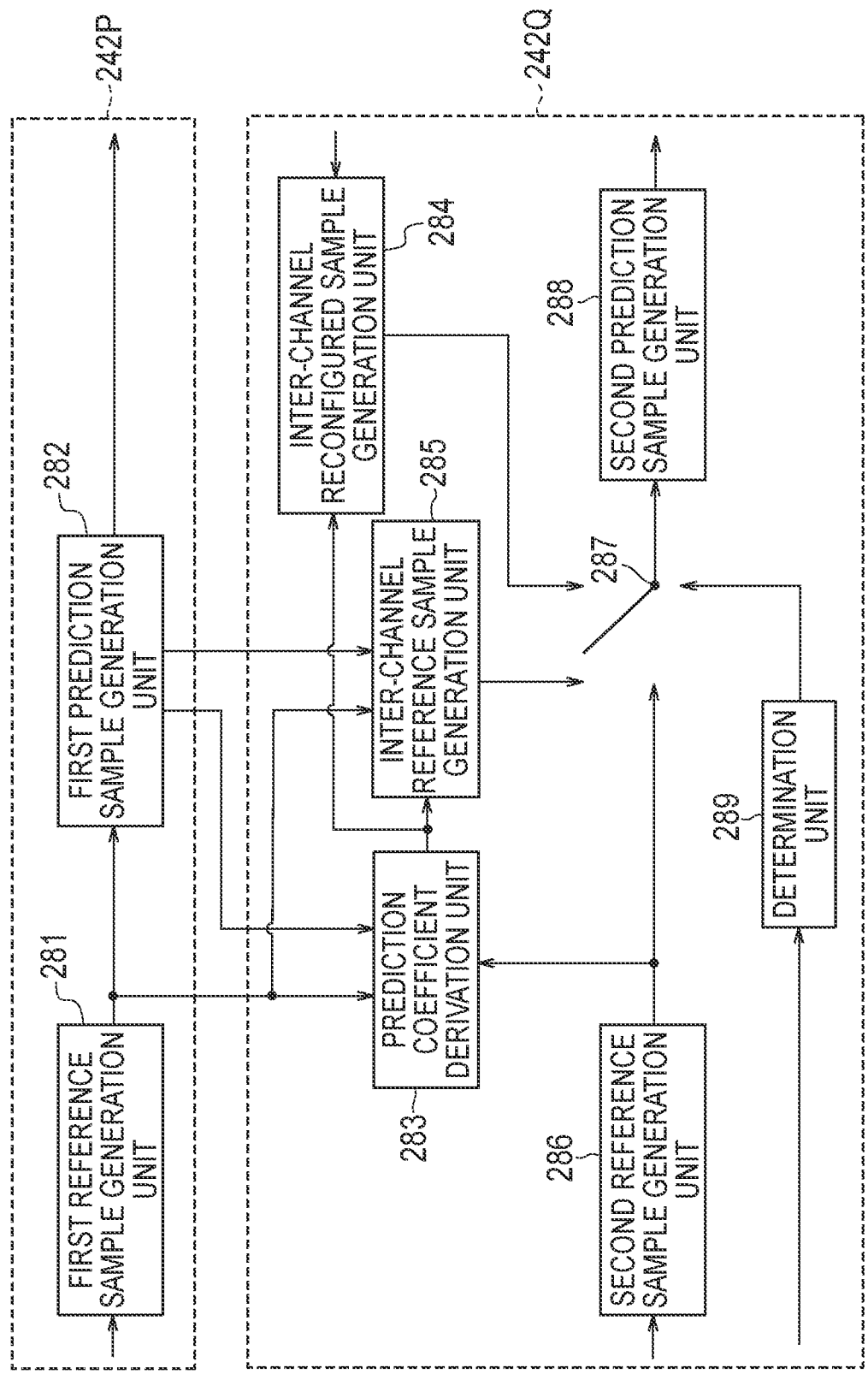
FIG. 5 is a diagram illustrating an intra-prediction unit 242 according to the embodiment.

An intra-prediction unit according to the embodiment will be described hereinbelow. FIG. 5 is a diagram illustrating an intra-prediction unit 242 according to the embodiment.

As illustrated in FIG. 5, the intra-prediction unit 242 has an intra-prediction unit 242P and an intra-prediction unit 242Q. The intra-prediction unit 242P generates a prediction signal of a first component through intra-prediction. For example, the first component is a luminance component. The intra-prediction unit 242Q generates a prediction signal of a second component through intra-prediction. For example, the second component is a color-difference component.

First, the intra-prediction unit 242P has a first reference sample generation unit 281 and a first prediction sample generation unit 282.

Like the first reference sample generation unit 181, the first reference sample generation unit 281 generates a reference sample of the first component. For example, when a sample in a target reference position has been encoded, the first reference sample generation unit 281 generates, as a reference sample, a pre-filtering decoded signal of the first component outputted from the adder 122. On the other hand, when a sample in the target reference position has not been encoded, the first reference sample generation unit 281 generates, as a reference sample, a copy of a sample encoded in a reference position adjacent to the target reference position. The first reference sample generation unit 281 may also perform smoothing processing of the reference sample.

Like the first prediction sample generation unit 182, the first prediction sample generation unit 282 generates a prediction sample of a first component by using the reference sample outputted from the first reference sample generation unit 281. In the embodiment, the first prediction sample generation unit 282 is an example of a decoding-side first generation unit. Intra-prediction modes for generating a prediction sample of the first component include a DC prediction mode, a planar prediction mode, and a directional prediction mode. The first prediction sample generation unit 282 outputs an intra-prediction mode for generating a prediction sample of the first component contained in the target unit to a prediction coefficient derivation unit 283 and an inter-channel reference sample generation unit 285.

Second, the intra-prediction unit 242Q includes the prediction coefficient derivation unit 283, an inter-channel reconfigured sample generation unit 284, the inter-channel reference sample generation unit 285, a second reference sample generation unit 286, a switch 287, a second prediction sample generation unit 288, and a determination unit 289.

Like the prediction coefficient derivation unit 183, the prediction coefficient derivation unit 283 derives a prediction coefficient which is used to generate a linear prediction sample of a second component on the basis of a sample of a first component. For example, the prediction coefficient derivation unit 283 may use a sample of the first component to derive the prediction coefficient, may use an intra-prediction mode of the first component to derive the prediction coefficient, or may use a reference sample of a second component to derive the prediction coefficient. The prediction coefficient derivation unit 283 may derive the prediction coefficient by using two or more of a sample of a first component, an intra-prediction mode of the first component, and a reference sample of a second component. In the embodiment, the prediction coefficient derivation unit 283 derives a first coefficient which is applied to a sample of the first component which is equal to or below a threshold value, and a second coefficient which is applied to a sample of the first component which is greater than the threshold value. The first coefficient and second coefficient are different from each other.

For example, the foregoing linear prediction is represented by the equation below. $\alpha 1$ and $\beta 1$ denote the first coefficient, and $\alpha 2$ and $\beta 2$ denote the second coefficient. $Pred_C[x,y]$ is a second-component linear prediction sample of a sample $[x,y]$, and $S'_L[x,y]$ is a first-component sample of sample $[x,y]$.

$$Pred_C[x,y]=\alpha_1 \times S'_L[x,y]+\beta_1 \text{ if } S'L[x,y] \leq \text{Threshold}$$

$$Pred_C[x,y]=\alpha_2 \times S'_L[x,y]+\beta_2 \text{ if } S'L[x,y] > \text{Threshold} \qquad \text{Equation 2}$$

Here, the threshold value is set on the basis of a parameter representing a distribution of or a change in a reference sample of the first component and/or the second component contained in a reference unit which is referenced for the target unit. The parameter may be any one of a differential value of the reference sample, a derivative value of the reference sample, a histogram of the reference sample, a median of the reference sample, and the position of an edge component of the reference sample. The details of the threshold value setting method will be described subsequently.

In the embodiment, the prediction coefficient derivation unit 283 may select a reference unit according to an intra-prediction mode which is acquired from the first prediction sample generation unit 282. For example, when the intra-prediction mode is horizontally close, the prediction coefficient derivation unit 283 selects a reference unit which is located horizontally to the target unit instead of selecting a reference unit which is located perpendicularly to the target unit. When the intra-prediction mode is perpendicularly close, the prediction coefficient derivation unit 283 selects a reference unit which is located perpendicularly to the target unit instead of selecting a reference unit which is located horizontally to the target unit.

Like the inter-channel reconfigured sample generation unit 184, the inter-channel reconfigured sample generation unit 284 uses a sample of the first component (here, a reconfigured sample of the first component) and a prediction coefficient to generate a linear prediction sample of the second component. In the embodiment, the prediction coefficient derivation unit 283 and inter-channel reconfigured sample generation unit 284 are examples of decoding-side linear prediction units. More specifically, the inter-channel reconfigured sample generation unit 284 uses the reconfigured sample of the first component contained in the target unit and the prediction coefficient outputted from the prediction coefficient derivation unit 283 to generate the linear prediction sample of the second component contained in the target unit. Although the inter-channel reconfigured sample generation unit 284 generates the linear prediction sample of the second component according to the foregoing equation, $S'L[x,y]$ is a reconfigured sample ($Rec'L[x,y]$) of the first component and is a pre-filtering decoded signal which is outputted from the adder 230 illustrated in FIG. 4.

Like the inter-channel reference sample generation unit 185, the inter-channel reference sample generation unit 285 uses a sample of the first component (here, a reference sample of the first component) and a prediction coefficient to generate a linear prediction sample of the second component. In the embodiment, the prediction coefficient derivation unit 283 and inter-channel reference sample generation unit 285 are examples of decoding-side linear prediction units. More specifically, the inter-channel reference sample generation unit 285 uses the reference sample of the first component contained in the reference unit and the prediction coefficient outputted from the prediction coefficient derivation unit 283 to generate the linear prediction sample of the second component contained in the reference unit. Although the inter-channel reference sample generation unit 285 generates the linear prediction sample of the second component according to the foregoing equation, S'L[x,y] is a reference sample (RefL[x,y]) of the first component and is a pre-filtering decoded signal which is outputted from the adder 230 illustrated in FIG. 4.

In the embodiment, the inter-channel reference sample generation unit 285 may select a reference unit according to an intra-prediction mode which is acquired from the first prediction sample generation unit 282. For example, when the intra-prediction mode is horizontally close, the inter-channel reference sample generation unit 285 selects a reference unit which is located horizontally to the target unit instead of selecting a reference unit which is located perpendicularly to the target unit. When the intra-prediction mode is perpendicularly close, the inter-channel reference sample generation unit 285 selects a reference unit which is located perpendicularly to the target unit instead of selecting a reference unit which is located horizontally to the target unit.

Like the second reference sample generation unit 186, the second reference sample generation unit 286 generates a reference sample of the second component. For example, when a sample in a target reference position has been encoded, the second reference sample generation unit 286 generates, as a reference sample, a pre-filtering decoded signal of the second component outputted from the adder 122. On the other hand, when a sample in the target reference position has not been encoded, the second reference sample generation unit 286 generates, as a reference sample, a copy of a sample encoded in a reference position adjacent to the target reference position. The second reference sample generation unit 286 may also perform smoothing processing of the reference sample.

Like the switch 187, the switch 287 switches the input to the second prediction sample generation unit 288 on the basis of the determination result of the determining unit 289. More specifically, the switch 287 selects an input source to the second prediction sample generation unit 288 from among the inter-channel reconfigured sample generation unit 284, the inter-channel reference sample generation unit 285, and the second reference sample generation unit 286.

Like the second prediction sample generation unit 188, the second prediction sample generation unit 288 generates a prediction sample of the second component by using a reference sample or a linear prediction sample which is acquired from the input source switched using the switch 287. In the embodiment, the second prediction sample generation unit 288 is an example of a decoding-side second generation unit.

Here, when the input source is the second reference sample generation unit 286, the second prediction sample generation unit 288 generates the prediction sample of the second component by using the reference sample outputted from the second reference sample generation unit 286. Intra-prediction modes for generating a prediction sample of the second component include a DC prediction mode, a planar prediction mode, and a directional prediction mode.

On the other hand, when the input source is the inter-channel reconfigured sample generation unit 284, the second prediction sample generation unit 288 outputs, as the prediction sample of the second component, a second-component linear prediction sample of the target unit outputted from the inter-channel reconfigured sample generation unit 284 (see FIG. 6). When the input source is the inter-channel reference sample generation unit 285, the second prediction sample generation unit 288 generates the second-component prediction sample of the target unit through intra-prediction using the second-component linear prediction sample of the reference unit outputted from the inter-channel reference sample generation unit 285 (see FIG. 7).

Linear Prediction Method

Figure 7:
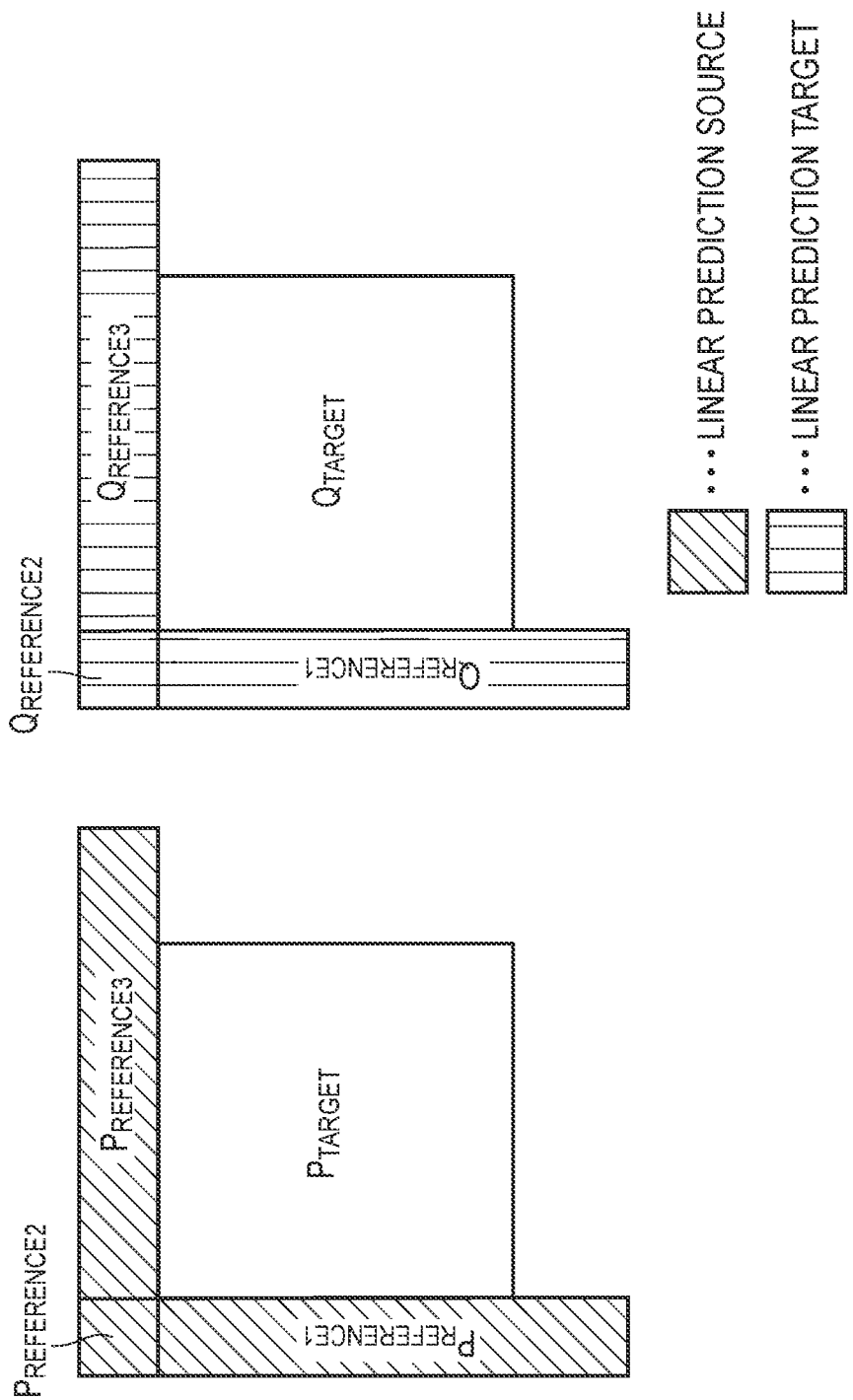
FIG. 7 is a diagram to illustrate the linear prediction method according to the embodiment.

The linear prediction method according to the embodiment will be described hereinbelow. FIGS. 6 and 7 are diagrams to illustrate a linear prediction method according to the embodiment. In FIGS. 6 and 7, PTARGET indicates a target unit of a first component, and PREFERENCE indicates a reference unit of the first component. QTARGET indicates a target unit of a second component, and QREFERENCE indicates a reference unit of the second component.

First, the operations of the prediction coefficient derivation unit 183, the prediction coefficient derivation unit 283, the inter-channel reconfigured sample generation unit 184, and the inter-channel reconfigured sample generation unit 284 will be described. The foregoing units are referred to collectively here as linear prediction units.

As illustrated in FIG. 6, the linear prediction unit generates a QTARGET prediction sample of a second component on the basis of a PTARGET reconfigured sample of a first component. In this case, the PTARGET reconfigured sample is constituted by a PTARGET prediction sample and a PTARGET residual sample. The PTARGET prediction sample is generated using PREFERENCE. A QREFERENCE reference sample is not used in the generation of the QTARGET prediction sample.

Second, the operations of the prediction coefficient derivation unit 183, the prediction coefficient derivation unit 283, the inter-channel reference sample generation unit 185, and the inter-channel reference sample generation unit 285 are described. The foregoing units are referred to collectively here as linear prediction units.

As illustrated in FIG. 7, the linear prediction unit generates a QREFERENCE reference sample of a second component on the basis of a PREFERENCE of a first component. In such a case, the QTARGET prediction sample is generated through intra-prediction using the QREFERENCE reference sample. A PTARGET reconfigured sample is not used in the generation of the QTARGET prediction sample.

As mentioned earlier, the prediction coefficients $\alpha$ and $\beta$ are used in such linear prediction. Prediction coefficients include a first coefficient which is applied to a sample of the first component which is equal to or below a threshold value, and a second coefficient which is applied to a sample of the first component which is greater than the threshold value.

Here, as mentioned earlier, the reference unit may be selected according to the intra-prediction mode of the first component. For example, when the intra-prediction mode is horizontally close, PREFERENCE1 and QREFERENCE1 are selected as reference units instead of PREFERENCE2, PREFERENCE3, QREFERENCE2, and QREFERENCE3 being selected. For example, when the intra-prediction mode is perpendicularly close, PREFERENCE3 and QREFERENCE3 are selected as reference units instead of PREFERENCE1, PREFERENCE2, QREFERENCE1, and QREFERENCE2 being selected.

Threshold Value Setting Method

Figure 8:
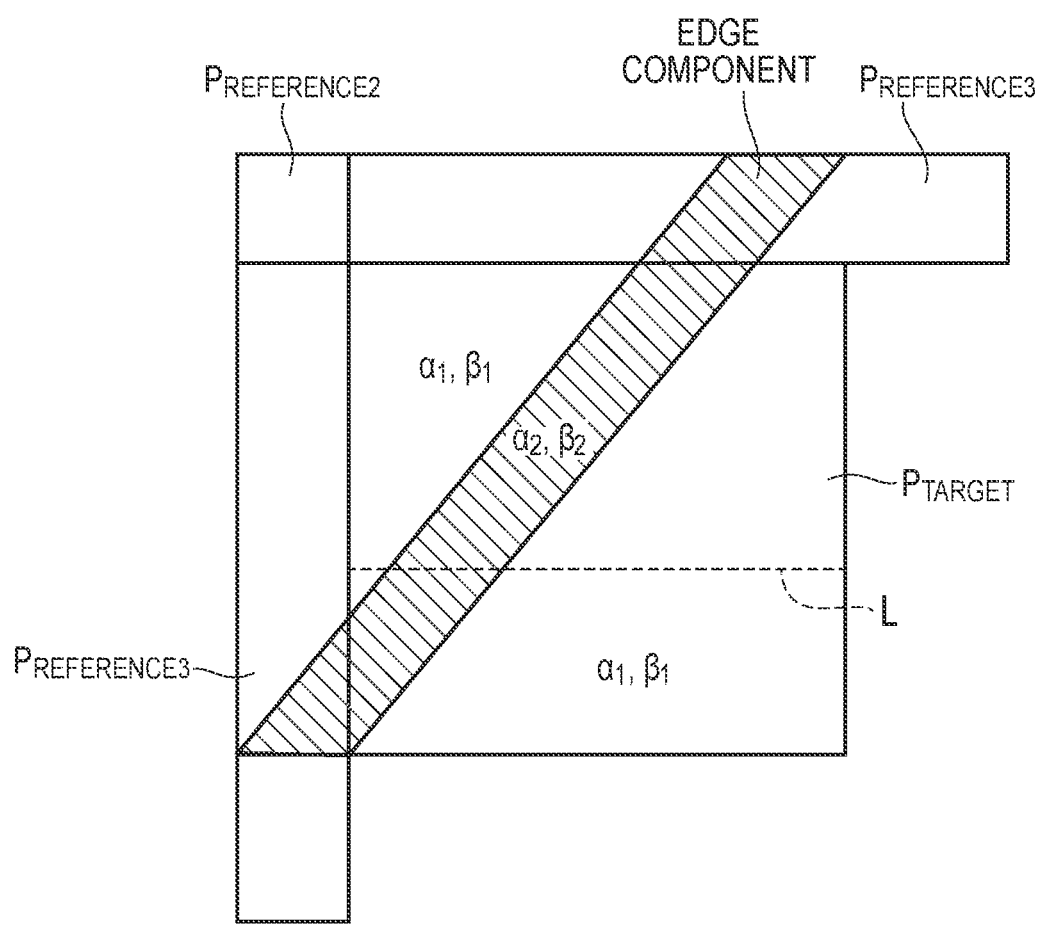
FIG. 8 is a diagram to illustrate a threshold value setting method according to the embodiment.

The threshold value setting method according to the embodiment will be described hereinbelow. FIGS. 8 and 9 are diagrams to illustrate the threshold value setting method according to the embodiment. Here, as illustrated in FIG. 8, a case in which a reference unit (PREFERENCE) and a target unit of a first component include an edge component (PTARGET) is exemplified. The reference sample is a sample which is included in the reference unit (PREFERENCE) of the first component (that is, the luminance component).

In such a case, when the straight line L illustrated in FIG. 8 is considered, the relationship between the luminance value and position is represented by the top diagram of FIG. 9.

First, as illustrated by the bottom-left diagram of FIG. 9, the prediction coefficient derivation unit 183 may set a threshold value on the basis of a reference sample differential value. More specifically, the prediction coefficient derivation unit 183 specifies the luminance value of an edge component on the basis of the reference sample differential value and sets the threshold value to separate an edge component from components other than the edge component. The reference sample differential value is an example of a parameter representing a change in the reference sample. A reference sample derivative value may also be used as a parameter representing a change in the reference sample.

Second, as illustrated by the bottom-right diagram of FIG. 9, the prediction coefficient derivation unit 183 may set a threshold value on the basis of a reference sample histogram. More specifically, the prediction coefficient derivation unit 183 sets a threshold value to separate two peaks from each other on the basis of the reference sample differential value. The reference sample histogram is an example of a parameter representing a reference sample distribution. The median of the reference sample or the position of an edge component of the reference sample may also be used as a parameter representing a reference sample distribution.

In such a case, the image encoding device 100 may transmit an information element indicating a threshold value or an information element indicating a threshold value calculation method (an index indicating the parameter representing a change in the reference sample) to the image decoding device 200 as control data. The image decoding device 200 may set the threshold value on the basis of the control data.

Here, in the bottom-right diagram of FIG. 9, after re-ordering the reference sample luminance values in ascending order or descending order, one or more threshold values may be set by dividing the reference samples arranged in ascending or descending order of luminance value into X equal parts (X is equal to or greater than 2).

Action and Effect

In the image decoding device 200 according to the embodiment, the threshold value for using a prediction coefficient is set on the basis of a parameter representing a distribution of or a change in the reference sample of the first component and/or the second component. In comparison with a case where the threshold value is set on the basis of an average value of the reference samples, information relating to an edge component can be taken into account, enabling the prediction coefficient to be used suitably.

In the image encoding device 100 according to an outline of the disclosure, the threshold value for using a prediction coefficient is set on the basis of a parameter representing a distribution of or a change in the reference sample of the first component and/or the second component. In comparison with a case where the threshold value is set on the basis of an average value of the reference samples, information relating to an edge component can be taken into account, enabling the prediction coefficient to be used suitably.

Modification Example 1

A modification example 1 of the embodiment will be described hereinbelow. Differences from the embodiment will primarily be described hereinbelow.

First, the prediction coefficient derivation unit 183 (linear prediction unit) calculates a first coefficient on the basis of a reference sample which is equal to or below the threshold value and may calculate a second coefficient on the basis of a reference sample which is greater than the threshold value.

There are no particular limitations on the method for calculating the first and second coefficients, but the method described in JVET-D0110 (Qualcomm) by the Joint Video Exploration Team (JVET) of ITU-T SG 16 WP 3 and ISO/IEC JTC 1/SC 29/WG 11, for example, may be adopted. However, it should be noted that when such a method is used in the embodiment, the reference samples which are referenced in calculating the first and second coefficients are different from each other. In such a case, the prediction coefficient derivation unit 283 (linear prediction unit) may calculate the first and second coefficients in the same order as the prediction coefficient derivation unit 183.

Second, the prediction coefficient derivation unit 183 (linear prediction unit) may select the first coefficient from among predefined prediction coefficients on the basis of a reference sample which is equal to or below a threshold value, and may select the second coefficient from among predefined prediction coefficients on the basis of a reference sample which is greater than the threshold value.

There are no particular limitations on the method for selecting the first and second coefficients, but the method described in JP 2016-72903 A, for example, may be adopted. However, it should be noted that when such a method is used in the embodiment, the reference samples which are referenced in calculating the first and second coefficients are different from each other.

In such a case, the image encoding device 100 may transmit an information element indicating selected first and second coefficients (for example, an index associated with prediction coefficients) to the image decoding device 200 as control data. The prediction coefficient derivation unit 283 (the linear prediction unit) may select the first and second coefficients from among predefined prediction coefficients on the basis of the control data received from the image encoding device 100.

Modification Example 2

A modification example 2 of the embodiment will be described hereinbelow. Differences from the embodiment will primarily be described hereinbelow.

The foregoing reconfigured sample of the first component is constituted by a first-component prediction sample and a first-component residual sample. Therefore, the reconfigured sample of the first component can be represented by the equation below.

Equation 3

$$Pred_c[x, y] = \alpha \times S'_L[x, y] + \beta$$
$$= \alpha \times (Pred_L[x, y] + Res_L[x, y]) + \beta$$
$$= \alpha \times (Pred_L[x, y]) + \beta + \alpha \times Res_L[x, y]$$
$$= \alpha \times (Pred_L[x, y]) + \beta + CCP(Res_L[x, y])$$
$$= \alpha \times IntraPred(Ref_L)[x, y] + \beta + \alpha \times Res_L[x, y]$$
$$= IntraPred(\alpha \times Ref_L + \beta)[x, y] + CCP(Res_L[x, y])$$

First, PredL[x,y] denotes a first-component prediction sample of a target unit, and ResL[x,y] denotes a first-component residual sample of the target unit. A CCP(ResL [x,y]) denotes a correction component based on the first-component residual sample of the target unit.

Therefore, the inter-channel reconfigured sample generation unit 184 and the inter-channel reconfigured sample generation unit 284 may be considered to generate a second-component linear prediction sample of the target unit by using the first-component prediction sample of the target unit and a prediction coefficient without waiting for the generation of a first-component reconfigured sample of the target unit. In such a case, the second-component linear prediction sample of the target unit is preferably corrected using CCP(ResL[x,y]).

Second, RefL denotes the first-component reference sample of the reference unit; α×RefL+β denotes the second-component linear prediction sample of the reference unit generated by the inter-channel reference sample generation unit 185 and the inter-channel reference sample generation unit 285; and IntraPred(α×RefL+β)[x,y] is the second-component prediction sample of the target unit generated through intra-prediction of the second-component linear prediction sample of the reference unit. Also in this case, the second-component linear prediction sample of the reference unit or the second-component prediction sample of the target unit may be corrected using CCP(ResL[x,y]).

In the foregoing case, the image encoding device 100 may transmit an information element indicating CCP(ResL[x,y]) (for example, an index indicating CCP(ResL[x,y])) to the image decoding device 200 as control data. The image decoding device 200 may also perform correction using CCP(ResL[x,y]) on the basis of the control data.

Modification Example 3

A modification example 3 of the embodiment will be described hereinbelow. Differences from the embodiment will primarily be described hereinbelow.

In modification example 3, a reference for determining whether to apply two or more types of prediction coefficients (first and second coefficients) will be described.

First, a determination of whether two or more types of prediction coefficients are applied may be made on the basis of the result of a comparison between a unit size (at least any one of an encoding unit size, a prediction unit size, and a transform unit size) and a predetermined size. Two or more types of prediction coefficients may be applied when the unit size is smaller than the predetermined size. In other words, two or more types of prediction coefficients need not be applied when the unit size is greater than the predetermined size. According to this configuration, in a case where the unit size is greater than the predetermined size, two or more types of prediction coefficients can be suitably applied based on the understanding that the setting of a threshold value that takes into account an edge component will likely not be performed suitably.

Second, a determination of whether two or more types of prediction coefficients are applied may be made on the basis of the result of a comparison between an aspect ratio of units (at least any one of an encoding unit, a prediction unit, and a transform unit), and a predetermined aspect ratio. Two or more types of prediction coefficients may be applied when the unit aspect ratio is greater than the predetermined aspect ratio. In other words, two or more types of prediction coefficients need not be applied when the unit aspect ratio is smaller than the predetermined aspect ratio. According to this configuration, in a case where the unit aspect ratio is greater than the predetermined aspect ratio, two or more types of prediction coefficients can be suitably applied based on the understanding that there is high likelihood of a unit containing an edge component.

Third, two or more types of prediction coefficients may be applied when the unit size is smaller than a predetermined size and an intra-prediction mode is perpendicularly or horizontally close. In other words, two or more types of prediction coefficients need not be applied when the unit size is greater than a predetermined size or an intra-prediction mode is not perpendicularly or horizontally close. According to this configuration, in a case where the unit size is smaller than a predetermined size and an intra-prediction mode is perpendicularly or horizontally close, two or more types of prediction coefficients can be suitably applied based on the understanding that there is a high likelihood of a unit containing a striped pattern (a plurality of edge components).

Modification Example 4

A modification example 4 of the embodiment will be described hereinbelow. Differences from the embodiment will primarily be described hereinbelow.

As mentioned earlier, the determination unit 189 selects the input source for which the encoding efficiency is highest. In this case, the determination unit 189 may set a threshold value on the basis of two or more parameters and calculate the encoding efficiency of each of the two or more threshold values thus set. The determination unit 189 determines that the threshold value for which the encoding efficiency is highest is to be used. In addition, the determination unit 189 may derive two or more types of prediction coefficients (a combination of first and second coefficients) and calculate the encoding efficiency of each of the two or more types of prediction coefficients thus derived. The determination unit 189 determines that the prediction coefficient for which the encoding efficiency is highest is to be used.

Furthermore, the determination unit 189 may set the threshold value on the basis of two or more parameters, derive two or more types of prediction coefficients (a combination of first and second coefficients), and calculate the encoding efficiency of each combination of threshold value and prediction coefficients. The determination unit 189 determines that the combination of threshold value and prediction coefficients for which the encoding efficiency is highest is to be used.

However, the embodiment and modification example 4 are not limited to the foregoing methods, rather, one type of method may be determined beforehand for the threshold value setting method and the prediction coefficient derivation method.

Further Embodiments

The present invention was described by means of the foregoing embodiment but the description and the drawings of the parts in this disclosure should not be understood as limiting the invention. Based on this disclosure, a variety of alternative embodiments, embodiment examples, and production techniques are obvious to a person skilled in the art.

In the embodiment, the threshold value is set on the basis of a parameter representing a distribution of or a change in a reference sample of a first component. However, the embodiment is not limited to or by such an arrangement. The threshold value may also be set on the basis of a parameter representing a distribution of or a change in a reference sample of a second component. The threshold value may also be set on the basis of a parameter representing a distribution of or a change in a reference sample of both a first component and a second component.

In the embodiment, the threshold value is set on the basis of a parameter representing a distribution of or a change in a reference sample which is contained in a reference unit. However, the embodiment is not limited to or by such an arrangement. The threshold value may also be set on the basis of a parameter representing a distribution of or a change in a sample which is contained in a target unit.

In the embodiment, a case where there is one type of threshold value and there are two types of prediction coefficients has mainly been described. However, the embodiment is not limited to or by such an arrangement. There may also be two or more types of threshold values and three or more types of prediction coefficients.

Although there is no particular mention in the embodiment, the size of the first-component target unit may differ from the size of the second-component target unit. For example, when the size of the first-component target unit is greater than the size of the second-component target unit, downsampling of the first-component target unit may be performed. There are no particular limitations on the downsampling method, but the method disclosed in JVET-D0110 (Qualcomm) of the Joint Video Exploration Team (JVET) of ITU-T SG 16 WP 3 and ISO/IEC JTC 1/SC 29/WG 11 may be adopted, for example.

Although there is no particular mention in the embodiment, when linear prediction is to be performed, the second-component intra-prediction unit 112Q may use the same intra-prediction mode as the intra-prediction mode used by the first-component intra-prediction unit 112P.

In the embodiment, the second prediction sample generation unit 188 generates a prediction sample of the second component by using a reference sample or a linear prediction sample which is acquired from the input source switched using the switch 187. However, the embodiment is not limited to or by such an arrangement. The second prediction sample generation unit 188 may generate a prediction sample of the second component through the weighted addition of a reference sample and a linear prediction sample.

In the embodiment, like the second prediction sample generation unit 188, the second prediction sample generation unit 288 generates a prediction sample of the second component by using a reference sample or a linear prediction sample which is acquired from the input source switched using the switch 287. However, the embodiment is not limited to or by such an arrangement. The second prediction sample generation unit 188 may generate a prediction sample of the second component through the weighted addition of a reference sample and a linear prediction sample.

There are no particular limitations on the weighted addition method, but the method described in JVET-D0110 (Qualcomm) by the Joint Video Exploration Team (JVET) of ITU-T SG 16 WP 3 and ISO/IEC JTC 1/SC 29/WG 11, for example, may be adopted.

Although there is no particular mention in the embodiment, when the intra-prediction modes of the first and second components are the same, the determination unit 189 may determine whether or not to perform linear prediction.

In the embodiment, the image encoding device 100 includes both the inter-channel reconfigured sample generation unit 184 and the inter-channel reference sample generation unit 185. However, the embodiment is not limited to or by such an arrangement. The image encoding device 100 may include either the inter-channel reconfigured sample generation unit 184 or the inter-channel reference sample generation unit 185.

In the embodiment, the image decoding device 200 includes both the inter-channel reconfigured sample generation unit 284 and the inter-channel reference sample generation unit 285. However, the embodiment is not limited to or by such an arrangement. The image decoding device 200 may include either the inter-channel reconfigured sample generation unit 284 or the inter-channel reference sample generation unit 285.

In the embodiment, the first component is a luminance component and the second component is a color-difference component. However, the embodiment is not limited to or by such an arrangement. For example, the first component may be a color-difference component and the second component may be a luminance component.

Although there is no particular mention in the embodiment, to determine whether the intra-prediction mode is perpendicularly close, it may be determined whether the angle between the direction of the intra-prediction mode and the perpendicular direction is smaller than a predetermined angle. An intra-prediction mode which is close to the perpendicular direction may be predefined. Similarly, to determine whether the intra-prediction mode is horizontally close, it may be determined whether the angle between the direction of the intra-prediction mode and the horizontal direction is smaller than a predetermined angle. An intra-prediction mode which is close to the horizontal direction may be predefined.

Although there is no particular mention in the embodiment, a program that causes a computer to execute the respective processing performed by the image encoding device 100 and the image decoding device 200 may be provided. Furthermore, the program may be recorded on a computer-readable medium. If a computer-readable medium is employed, the program can be installed on a computer. Here, the computer-readable medium whereon the program is recorded may also be a non-transitory recording medium. A non-transitory recording medium is not particularly limited and may be a recording medium such as a CD-ROM or DVD-ROM, for example.

Alternatively, a chipset may also be provided which is configured by: a memory that stores a program for executing the respective processing performed by the image encoding device 100 and the image decoding device 200; and a processor that executes the program stored in the memory.

What is claimed is:

1. An image decoding device, comprising:
a decoding-side first generation device that generates, for a target unit, a prediction sample of a first component;
a decoding-side linear prediction device that uses a sample of the first component and a prediction coefficient to generate a linear prediction sample of a second component; and
a decoding-side second generation device that outputs the linear prediction sample of the second component of the target unit, as a prediction sample of the second component of the target unit, wherein
the decoding-side linear prediction device
uses a first coefficient as the prediction coefficient when the sample of the first component is equal to or below a threshold value, and
uses a second coefficient which is different from the first coefficient as the prediction coefficient when the sample of the first component is greater than the threshold value,
the prediction coefficient is derived based on a reference sample of the first component and a reference sample of the second component contained in a reference unit which is referenced for the target unit and an intra-prediction mode which generates a prediction sample of the first component,
the threshold value is set on the basis of a parameter representing a distribution of or a change in the reference sample of the first component and/or the second component,
the reference sample of the first component and the reference sample of the second component which are used for deriving the prediction coefficient are selected according to the intra-prediction mode, and
the reference sample of the first component and the reference sample of the second component which are used for setting the threshold value are not selected according to the intra-prediction mode.

2. The image decoding device according to claim 1, wherein the parameter is any one of a differential value of the reference sample, a derivative value of the reference sample, a histogram of the reference sample, a median of the reference sample, and a position of an edge component of the reference sample.

3. The image decoding device according to claim 1, wherein the decoding-side linear prediction device calculates the first coefficient on the basis of the reference sample which is equal to or below the threshold value and calculates the second coefficient on the basis of the reference sample which is greater than the threshold value.

4. The image decoding device according to claim 1, wherein the decoding-side linear prediction device selects the first and second coefficients from among predefined prediction coefficients on the basis of control data received from the image encoding device.

5. The image decoding device according to claim 1, wherein
the first-component sample is a reconfigured sample of the first component contained in the target unit or the prediction sample of the first component contained in the target unit; and
the decoding-side linear prediction device uses the first-component sample and the prediction coefficient to generate the linear prediction sample of the second component contained in the target unit.

6. The image decoding device according to claim 1, wherein
the first-component sample is the reference sample of the first component contained in the reference unit; and
the decoding-side linear prediction device uses the first-component sample and the prediction coefficient to generate the linear prediction sample of the second component contained in the reference unit.

7. An image encoding device, comprising:
an encoding-side first generation device that generates, for a target unit, a prediction sample of a first component;
an encoding-side linear prediction device that uses a sample of the first component and a prediction coefficient to generate a linear prediction sample of a second component; and
an encoding-side second generation device that outputs the linear prediction sample of the second component to generate, for the target unit, as a prediction sample of the second component of the target unit, wherein
the encoding-side linear prediction device
uses a first coefficient as the prediction coefficient when the sample of the first component is equal to or below a threshold value, and
uses a second coefficient which is different from the first coefficient as the prediction coefficient when the sample of the first component is greater than the threshold value,
the prediction coefficient is derived based on a reference sample of the first component and a reference sample of the second component contained in a reference unit which is referenced for the target unit and an intra-prediction mode which generates a prediction sample of the first component,
the threshold value is set on the basis of a parameter representing a distribution of or a change in the reference sample of the first component and/or the second component contained in a reference device which is referenced for the target unit,
the reference sample of the first component and the reference sample of the second component which are used for deriving the prediction coefficient are selected according to the intra-prediction mode, and
the reference sample of the first component and the reference sample of the second component which are used for setting the threshold value are not selected according to the intra-prediction mode.

8. An image processing system comprising an image encoding device and an image decoding device,
the image encoding device comprising:
an encoding-side first generation device that generates, for a target unit, a prediction sample of a first component;
an encoding-side linear prediction device that uses a sample of the first component and a prediction coefficient to generate a linear prediction sample of a second component; and
an encoding-side second generation device that outputs the linear prediction sample of the second component of the target unit, as a prediction sample of the second component of the target device unit; and
the image decoding device comprising:
a decoding-side first generation device that generates, for the target unit, a prediction sample of the first component;
a decoding-side linear prediction device that uses the sample of the first component and a prediction coefficient to generate a linear prediction sample of the second component; and a decoding-side second generation device that outputs the linear prediction sample of the second component of the target unit, as a prediction sample of the second component of the target unit, wherein the encoding-side linear prediction device and the decoding-side linear prediction device use a first coefficient as the prediction coefficient when the sample of the first component is equal to or below a threshold value, and use a second coefficient which is different from the first coefficient as the prediction coefficient when the sample of the first component is greater than the threshold value, the prediction coefficient is derived based on a reference sample of the first component and a reference sample of the second component contained in a reference unit which is referenced for the target unit and an intra-prediction mode which generates a prediction sample of the first component, the threshold value is set on the basis of a parameter representing a distribution of or a change in the reference sample of the first component and/or the second component contained in a reference device which is referenced for the target unit, the reference sample of the first component and the reference sample of the second component which are used for deriving the prediction coefficient are selected according to the intra-prediction mode, and the reference sample of the first component and the reference sample of the second component which are used for setting the threshold value are not selected according to the intra-prediction mode.

9. A non-transitory machine readable medium having stored thereon instructions comprising machine executable code which when executed by at least one machine, causes the machine to execute the steps of:

(A) generating, for a target unit, a prediction sample of a first component;

(B) using a sample of the first component and a prediction coefficient to generate a linear prediction sample of a second component; and (C) outputting the linear prediction sample of the second component of the target unit, as a prediction sample of the second component of the target unit, wherein the step (B) includes the steps of:

using a first coefficient as the prediction coefficient when the sample of the first component is equal to or below a threshold value; and using a second coefficient which is different from the first coefficient as the prediction coefficient when the sample of the first component is greater than the threshold value, the prediction coefficient is derived based on a reference sample of the first component and a reference sample of the second component contained in a reference unit which is referenced for the target unit and an intra-prediction mode which generates a prediction sample of the first component, the threshold value is set on the basis of a parameter representing a distribution of or a change in the reference sample of the first component and/or the second component contained in a reference device which is referenced for the target unit, the reference sample of the first component and the reference sample of the second component which are used for deriving the prediction coefficient are selected according to the intra-prediction mode, and the reference sample of the first component and the reference sample of the second component which are used for setting the threshold value are not selected according to the intra-prediction mode.

10. An image decoding device, comprising:

a decoding-side first generation device that generates, for a target unit, a prediction sample of a first component;

a decoding-side linear prediction device that uses a sample of the first component and a prediction coefficient to generate a linear prediction sample of a second component; and a decoding-side second generation device that uses the linear prediction sample of the second component of a reference unit which is referenced for the target unit to generate a prediction sample of the second component of the target unit, wherein the decoding-side linear prediction device:

uses a first coefficient as the prediction coefficient when the sample of the first component is equal to or below a threshold value, and uses a second coefficient which is different from the first coefficient as the prediction coefficient when the sample of the first component is greater than the threshold value, the prediction coefficient is derived based on a reference sample of the first component and a reference sample of the second component contained in the reference unit and an intra-prediction mode which generates a prediction sample of the first component, the threshold value is set on the basis of a parameter representing a distribution of or a change in the reference sample of the first component and/or the second component contained in a reference device which is referenced for the target unit, and the reference sample of the first component and the reference sample of the second component which are used for deriving the prediction coefficient are selected according to the intra-prediction mode, and the reference sample of the first component and the reference sample of the second component which are used for setting the threshold value are not selected according to the intra-prediction mode.

* * * * *